Figure 2:
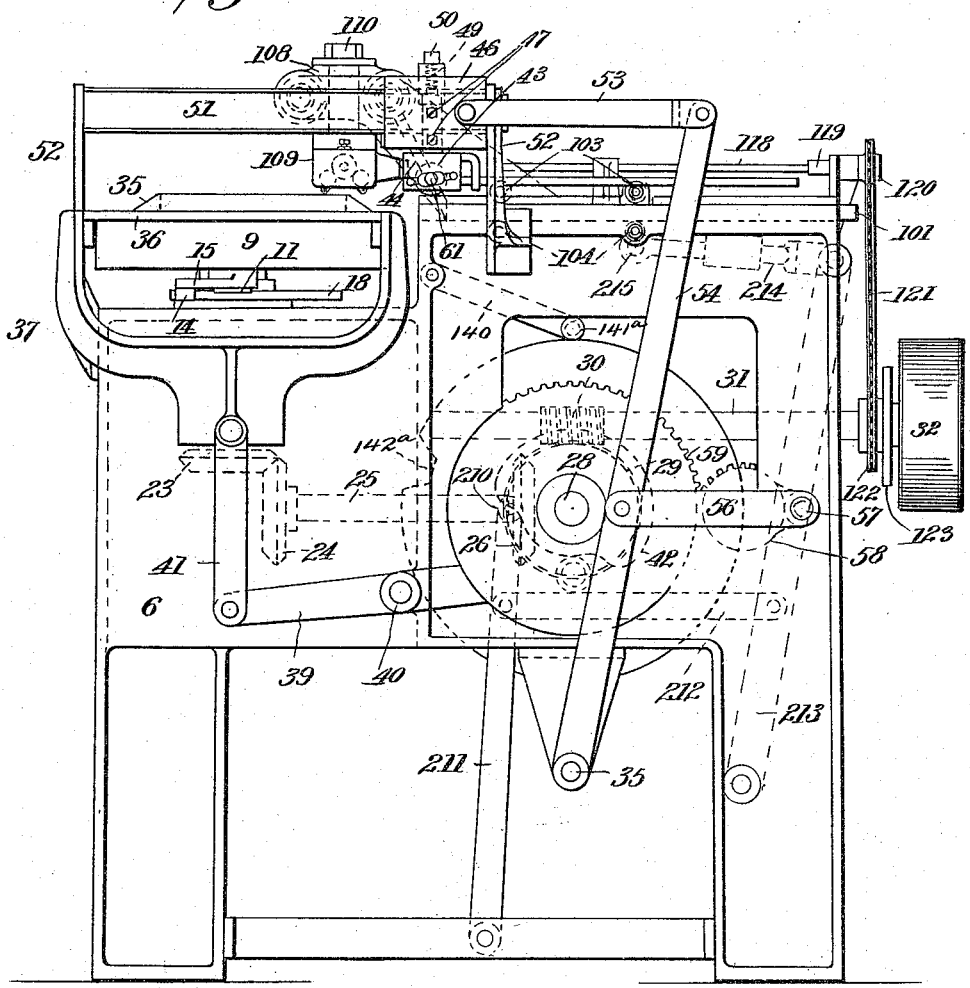

W. A. MOONEY.
CIGAR MAKING MACHINE.
APPLICATION FILED JULY 13, 1915.

1,201,069.

Patented Oct. 10, 1916.
5 SHEETS—SHEET 1.

Fig. 1.

Inventor
William A. Mooney
by Geo. E. Tew
Attorney

W. A. MOONEY.
CIGAR MAKING MACHINE.
APPLICATION FILED JULY 13, 1915.

1,201,069.

Patented Oct. 10, 1916.
5 SHEETS—SHEET 4.

Inventor
William A. Mooney
by Geo. E. Tew
Attorney

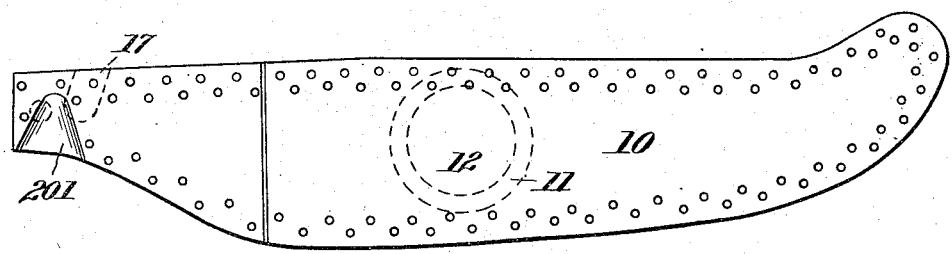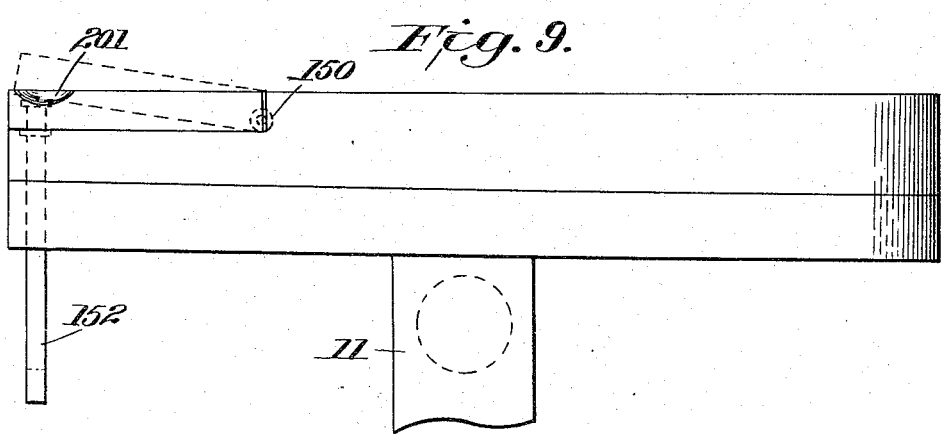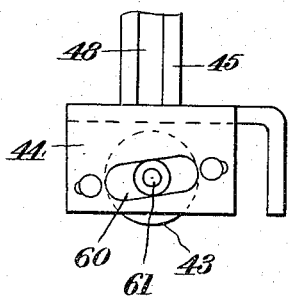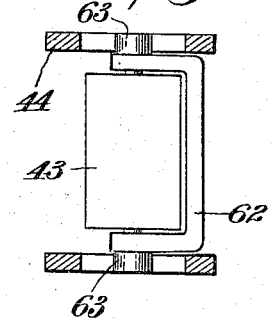

ial plan of the same.
UNITED STATES PATENT OFFICE.

WILLIAM AUGUSTINE MOONEY, OF RICHMOND, VIRGINIA.

CIGAR-MAKING MACHINE.

1,201,069.  Specification of Letters Patent.  Patented Oct. 10, 1916.

Application filed July 13, 1915. Serial No. 39,552.

*To all whom it may concern:*

Be it known that I, WILLIAM A. MOONEY, a citizen of the United States, residing at Richmond, in the county of Henrico and State of Virginia, have invented certain new and useful Improvements in Cigar-Making Machines, of which the following is a specification.

This invention relates to that type of wrapping machines in which a wrapper is applied to a previously formed bunch, the bunches being fed to the machine by any suitable means, and the wrappers being applied to a die with which a roller coöperates to cut the wrapper which is then transferred to the bunch in a rolling device which moves across the surface of the die or wrapper carrier.

A characteristic feature of the machine is a rotary disk or head which moves in its rotation to two positions. This head is mounted on a vertical axis, and carries suction dies, and it turns intermittently, first to one position in which the wrapper is applied thereto and cut on the die by means of a reciprocating roller, and second to a position opposite to the first position, in which latter position the wrapper is located in line with rolling devices mounted on a reciprocating carriage, which then turns across the wrapper so held and applies the same to the bunch which is at that time carried by the rolling device, having being fed thereto automatically. When the wrapper is so held in the wrapping position it is located in proper alinement with the rolling devices, at the proper angle to receive the bunch, and as the bunch advances the wrapper is held or stands at the proper angle to apply the wrapper to the bunch. The rolling devices are pivoted to a carriage, and as they travel over the wrapper the said devices and the bunch carried thereby changes its angle to accommodate or agree with the tapered shape of the bunch, so as to apply the wrapper smoothly. After the bunch takes up the wrapper the bunch carrier advances beyond the wrapper holder and the completed cigar is dropped beyond the end of the machine, to any suitable end cutting device.

An essential feature of the machine is the rotary head which is movable in its rotation to two positions in one of which it receives and cuts the wrapper, and in the other of which it transfers the wrapper to the bunch, the bunches being previously formed in a molding apparatus or otherwise.

The machine is capable of very rapid operation, since the wrapper dies are duplicated on the rotary head, and while one die is receiving the wrapper and cutting the same the other die is delivering a previously cut wrapper to the bunch.

Figure 3:
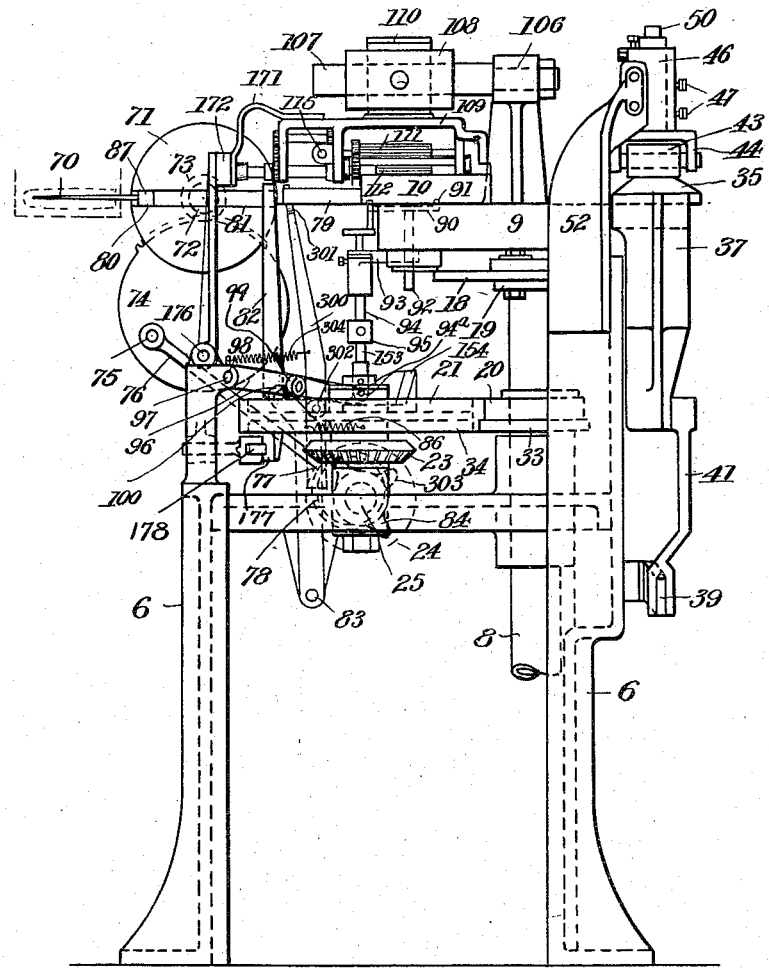
Figure 4:
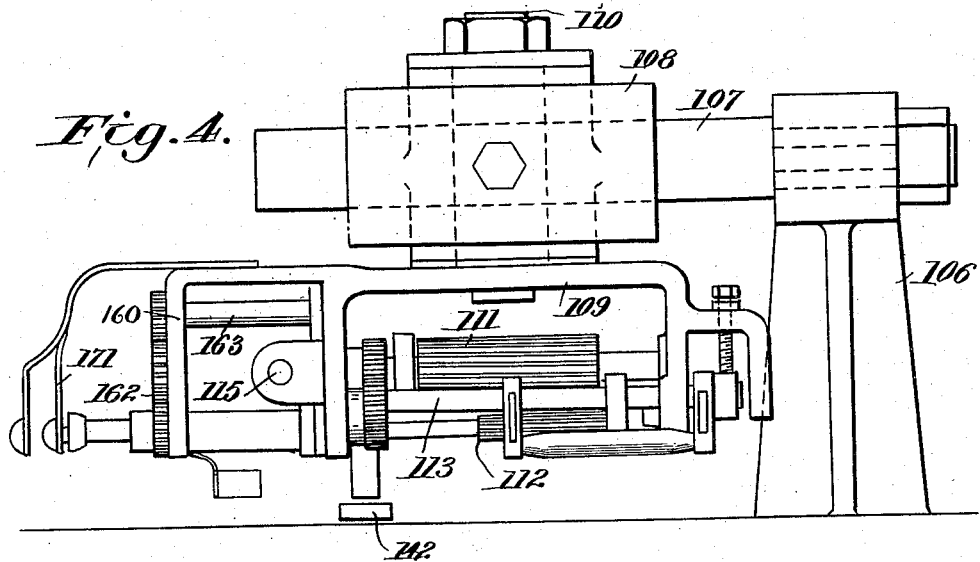
Figure 5:
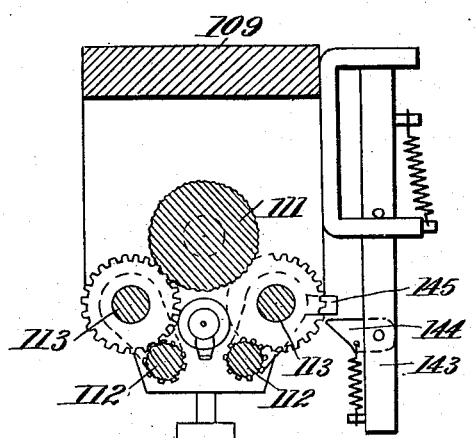
Figure 6:
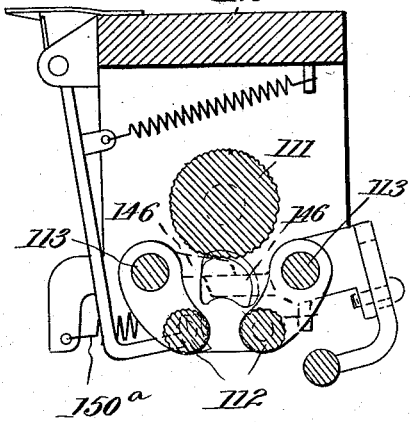
Figure 7:
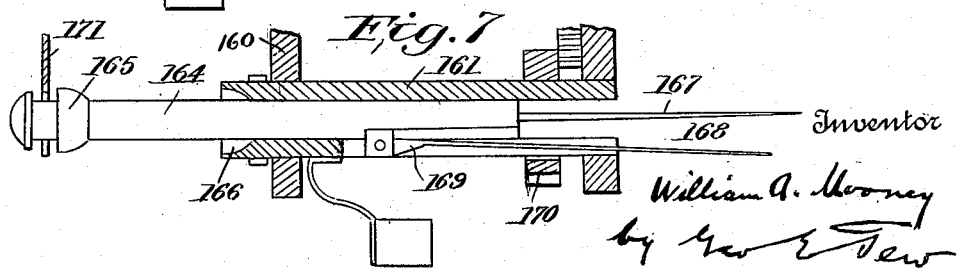

In the accompanying drawings, Figure 1 is plan of the machine. Fig. 2 is a side elevation. Fig. 3 is an end elevation. Fig. 4 is an elevation of the wrapping devices. Fig. 5 is a detail in cross section of the same. Fig. 6 is a cross section of the same. Fig. 7 is a detail in longitudinal section of the tucker devices. Fig. 8 is a plan of the wrapper holder. Fig. 9 is a side elevation thereof. Fig. 10 is a detail in end elevation of a cutter roller and associated parts. Fig. 11 is a sectional plan of the same.

In the drawings, 6 indicates the main frame of the machine of proper size and shape to support the parts to be hereinafter described.

Mounted in a suitable bearing 7 adjacent to one corner of the frame is a vertical shaft 8. This shaft is hollow and a suitable suction device (not shown) will be connected to its lower end for the purpose of producing a partial vacuum in the shaft and in the hollow head 9 mounted on the top thereof. At opposite points, and near the outer edge thereof, this head 9 carries a pair of suction heads or dies or wrapper holders 10 the upper faces of which are perforated so that the exhaust through the head will hold the wrapper thereon and carry the same therewith as they revolve. These suction heads have hollow circular stems 11 each of which has an opening 12 which communicates with the suction space in the head 9, through which the stems 11 extend. Each stem is provided at its lower end, under the head 9, with an arm 13 having a roller 14. A spring 15 is connected to each arm 13, and this spring tends to hold the suction head 9 in what I will term a "straight line" position, for applying the wrapper thereto and cutting the same. The movement of the head incident to the spring is limited by a stop pin 16 projecting from the top of the disk 9 in position to enter a notch 17 in the bottom of the suction head. This position is shown in Fig. 1.

As the disk 9 is rotated a half turn the roller 14 on the arm 13 strikes a fixed cam plate 18 secured to a bracket 19 on the frame of the machine, and against the tension of the spring 15 the head 10 is swung on its pivot 11 to an angular position, said angle being the proper one to agree with the transverse movement of the bunch carrier as it travels over said head, said position being also indicated in Fig. 1. When the disk 9 is given the next half turn the heads 10 exchange places, the head which takes the feeding position being drawn into the straight line position as permitted by the cam, and the other head being turned to angular position, to receive and deliver the wrappers respectively.

For producing the intermittent turning movement of the shaft 8 and disk 9, above referred to, the said shaft 8 is provided with a pinion 20 which meshes with a mutilated gear 21 carried on a stud shaft 22 which has a bevel gear 23 meshing with a bevel gear 24 on a horizontal shaft 25 which has a bevel gear 26 meshing with a bevel gear 27 on the main drive shaft 28 which has a worm gear 29 driven by a worm 30 from a drive shaft 31 to which power may be applied by a pulley 32, these shafts being supported by suitable bearing in the lower part of the frame. To lock the shaft 8 against overthrow I provide a Geneva disk 33 thereon which, except when the mutilated gear 21 is engaged, bears against the rim of a complementary disk 34 on the shaft 22, said stop motion releasing when the teeth of the gear 21 pick up the pinion. The number of teeth on the gear and pinion will be properly proportioned to give a half turn to the shaft 8 at each operation, after which there will be a dwell while the other operations are taking place.

In order to cut the wrapper after it is applied to the suction head a cutting die 35 is provided. This is carried on a plate 36 at the top of a yoke 37, and this yoke slides up and down on a guide 38 fastened to the frame 6, and it is operated by a lever 39 which is fulcrumed at 40 on the frame and connected to the yoke by a link 41, the lever being vibrated by a cam 42 on the main shaft 28, the outline of the cam being shown in Fig. 2. The plate 36 and cutting die 35 have an opening through the same of the shape of the suction head 10, and the cam 42 is of such shape that it will lift the plate 36 and cutting die above the head 10 during a certain period, and drop the same around said suction head during another perioid. When the cutting die is lifted by the means described it clears the suction head, and the disk 9 is then free to turn to carry the cut wrapper from the feeding position to the delivery position. When the cutting die is dropped its edge forms a border around the suction head, at which time the cutting of the wrapper is done. This cutting action is affected by means of a roller 43 which reciprocates over the suction head and cutting die, in contact with the latter, the cutting being done by the edge of the die 35 against which the wrapper is pressed by the roller 43. This roller is carried by a yoke 44 with a stem 45 held in a block 46 by screws 47 which engage in a groove 48 in the stem, which is pressed above by a spring 49 and adjusting nut 50, the spring serving to press the roller against the cutting die. The block 46 slides on a guide 51 supported by brackets 52 on the frame, and the block is reciprocated by means of a link 53 connecting the same to a lever 54 which is fulcrumed at 55 and operated by a link 56 connected to a crank pin 57 on a gear 58 which is driven by a mutilated gear 59 on the shaft 28 to give intermittent action to the lever 54 and the slide 46.

The roller 43 is so supported and operated that when it moves one way it presses against and cuts along one edge of the cutting die 35, and when the other way it cuts along the opposite edge. This is affected by means of oppositely inclined slots 60 in the yoke 44. That is, the slot in one arm of the yoke is inclined downwardly and forwardly and in the other arm of the yoke, it is inclined upwardly and forwardly. The roller is held by trunnion centers 61 in a small yoke 62 which fits inside of the yoke 44, and the small yoke 62 has projections 63 which fit in the slots 60. When the yoke 44 travels one way the projections 63 at one side will travel up one slot, and the projections 63 at the opposite side will travel down the other slot, and when the yoke 44 travels the other way the reverse action takes place. This has the effect on one stroke, of forcing down one end of the roller against one side or edge of the cutting die and lifting the opposite end from the other side, and when the reverse stroke takes place the roller tilts oppositely to contact with the other side of the cutting die, and so the roller tilts as it reciprocates, from one side of the die to the other, so that one edge of the wrapper is first cut and then the other. This gives a better cutting action than where an attempt is made to cut both edges of the wrapper simultaneously with a fixed or level roller.

From the construction of the machine thus far described it will be seen that the cutting die is first dropped until its cutting edge projects slightly above the face of the suction head or wrapper carrier. In this position the uncut wrapper is applied to the die. The roller 44 then travels forth and back across the cutting die and cuts the wrapper, and the cut wrapper is then held by the suction against the face of the suction device 10. The cutting die and plate 36 are then lifted to clear the suction head, which is then given a half turn, and the wrapper is carried to the wrapping position as above described, the other suction device 10 being at the same time returned to the feeding and cutting position, after which the cutting die is again lowered to receive another wrapper blank. The operating devices will be suitably constructed to properly time these various actions. To apply a wrapper so cut to a previously formed bunch, a bunch is placed or delivered from any suitable mold block onto a needle 70 which projects from a disk 71 which is rocked on a horizontal axis back and forth or given a half turn to transfer the bunch to the wrapping devices. This disk 71 is mounted on a rock shaft 72 which has a pinion 73 which meshes with an oscillating gear 74 connected by a wrist pin 75 and rod 76 to an eccentric strap 77 on an eccentric 78 on the shaft 25. As the shaft 25 rotates the eccentric causes an oscillation of the gear 74 and disk 71, so that the needle 70 is swung upwardly and over from its feeding position to deposit the bunch in a trough 79 slotted lengthwise. This needle 70 is carried by a block 80 which slides in a diametrical groove 81 in the face of the disk 71, and the needle is advanced and retracted by a lever 82 which is pivoted at 83 to a bracket on the frame and this lever is vibrated by a cam 84 on the shaft 25 and returned by a spring 86. The upper end of the lever 82 operates against a roller 87 on the block 80. When the needle is pointed outwardly the lever 82 by pressure against the roller 87 throws the needle 70 outwardly forcing the same into the bunch indicated at X. The disk 71 then turns over, carrying with it the needle and the bunch carried thereby, depositing the bunch in the outer end of the trough 79, the bunch being then stripped from the needle and advanced to the lifter by the following mechanism: The cam 84 has two projections, one of which swings the lever to the left to push the needle 70 into the bunch, and the other of which also swings the lever to the left to withdraw the needle from the bunch after it is swung over into the trough 79.

A lever 300 works in the slot in the trough 79 and the upper end of this lever is forked as at 301. The needle swings down between these forks, with the bunch in the trough in advance of the fork. The lever 82 is then swung out by one of the projections on cam 84, sliding the block 80 to the left and withdrawing the needle. At or about the same time the lever 300 swings to the right in the slot in the trough 79, carrying the bunch along the trough to the lifter 90. The lever 300 is fulcrumed at 302 and is operated by a cam 303 on the shaft 28, working against the lower end of the lever, and is returned by a spring 304. When the disk 71 returns or swings back the needle is again advanced into the bunch by the cam operated lever 82. The lifter 90 consists of a strip of metal having projections 91 at each end, on which the ends of the bunch rest after they are advanced along the trough when it is in lowered position. This bar or piece of metal 90 has depending stem 92 connected to an arm 93 projecting from a rod 94 which works in a guide 95 and is connected at its lower end at 94ª to a lever 96 which is pivoted at 97 to a bracket 98 on the frame. This lever has a roller 99 which rides over the cam 100 carried on the wheel 21 and lifts the same in proper time to raise the bunch to position where it may be taken by the rolling device. This device is mounted on a carriage or carriage plate 101 which slides in a guide 102, resting between rollers 103 and 104 at one edge and upon rollers 105 at the opposite edge. At its front end this plate has a bracket 106 which supports two bars 107 on which is mounted a bearing block 108 which carries the wrapping mechanism. This mechanism comprises a yoke 109 with a pivot stem 110 which has its bearing in the block 108. The arms of the yoke support the shafts of an upper corrugated roller 111 and two lower side rollers 112, the latter being pivotally hung from rock shafts 113. These rollers are geared together in a manner common to this type of mechanism, and they are turned by bevel gears 114 one of which is carried by a shaft 115 connected by a link shaft 116 and universal joints 117 to a shaft 118 which is splined into a sleeve 119 driven by a sprocket wheel 120, chain 121 and sprocket wheel 122, which is driven from the main shaft 31 by a train of gearing and an intermittent grip device which starts and stops the sprocket wheel 122 at the proper intervals. This grip device includes a trip lever 124 which is operated by link 125 connected to a lever 126 acted on by a cam 127 on the side of the main cam wheel 128 mounted on the shaft 28. The pivot stem 110 has an arm 130 connected by a link 131 to a lever 132 which is pivoted at 133 to a bracket on the carriage and carries a roller 134 which travels in a cam slot 135 in a plate 136 fastened to the frame of the machine. As the carriage reciprocates this cam slot and the lever causes the yoke 109 to turn on its pivot 110 to vary the angle of the rolling devices as they travel over the wrapper on the suction head 10.

When the lifter 90 lifts to deliver a bunch to the wrapping roller, the lower rollers 112 are caused to open by the operation of an arm 140 having a roller 141ª which drops in a notch 142ª in the main cam 128. This arm 140 projects from a rock shaft 141 which carries an arm 142 the lower end of which bears under a push bar 143 which has a toe 144 engaging a pin 145 projecting from one of the rock shafts 113 which is connected across to the other rock shaft 113 by arms 146 so that both of the lower rollers swing outwardly or open to admit the bunch therebetween, and when the roller 141 lifts from the notch 142 a spring 150$^a$ rocks the shafts 113 to throw the rollers 112 together under the bunch which is then held between said rollers and the roller 111. The bunch is thus grasped between the roller in position to be advanced to take up the wrapper. Primarily a tucking device is provided to lift the front or tucking end of the wrapper to the bunch. For this purpose the tuck end of the top or face plate of the suction head 10 is hinged to the body thereof as shown at 150, and this hinged part may be lifted by means of a lifter plate 151 engaging a pin 152 which works through the suction head and bears upwardly on the inside under said hinged part. The plate 151 is carried at the upper end of a push rod 153 which also works in the guide 95 and is lifted by a cam 154 on the wheel 21, so that the hinged part of the suction head is lifted in proper time. When it swings up, it carries with it the tuck end of the wrapper to contact with the bunch.

Supported by a bracket 160 on the yoke 109 is a sleeve 161 which is driven by gears 162 from a shaft 163 driven from the pinion shaft 115. Working through this sleeve 161 is a sliding shaft 164 provided with a cone clutch 165 which clutches against a cup 166 on the sleeve 161. The inner end of the shaft 164 carries a needle 167 and a spring finger 168 the latter working in a slot in the under side of the sleeve. On the finger 168 is a cam 169 which contacts with the inner side of a collar 170 when the shaft 164 is pushed in. This shaft is normally pushed out by a flat spring 171, but it may be pushed in by a lever 172 which bears against the ball 173 on the outer end of the shaft 164. The lever 172 is fulcrumed at 176 and is vibrated by means of a cam 177 on the lower side of the wheel 21 bearing against a roller 178 connected by an arm at the lower end of the lever 172.

When the bunch is brought into position over the tuck end of the wrapper and the said end is lifted by the hinged part 150, the lever 172 is operated to advance the shaft 164 which forces the needle 167 into the bunch, and at the same time the finger 168 enters under the tuck end of the wrapper and is closed against the same, whereby said end is gripped against the bunch. Then the clutch 165 takes hold (the part 150 having meanwhile dropped) and the rollers, the needle and the tucking finger, with the bunch, begin to rotate, and the wrapper is thereby wound on the bunch, the carriage moving forward at the same time to advance the bunch across or along the wrapper which is picked up or stripped from the suction head. During its forward movement the carriage oscillates on its vertical pivot to give the required shape to the finished cigar, and at the forward limit of its movement the lower rollers 112 are opened by contact of the push bar with an arm 200 on a receiving device (not shown) which allows the cigar to drop from the rollers. Meanwhile the lever 172 will have swung back and the spring 171 will have retracted the shaft 164 and withdrawn the needle and the tucking finger from the cigar. The hinged part 150 of the suction head has a notch 201 in the edge thereof to give room for the tucking finger to enter below the wrapper.

After the completion of the operation above described the carriage returns for the next operation, the rotary disk 9 having meanwhile turned to bring another cut wrapper into position for delivery to the rolling devices.

The carriage is advanced and retracted by a roller 210 on a lever 211 connected by a link 212 to another lever 213 which is connected by an adjustable link 214 to a stud 215 on the under side of the carriage 101. The pivotal connection of the links may be varied to change the stroke.

I claim:

1. In a cigar wrapping machine, the combination of a rotary head, a plurality of wrapper carriers mounted thereon and movable therewith to carry the wrapper from feeding to wrapping position, a bunch carrier movable across one of the wrapper carriers while it is in wrapping position, and means to apply the wrapper to the bunch as it moves across said wrapper carrier.

2. In a cigar wrapping machine, the combination of a rotary head, a plurality of wrapper carriers mounted thereon, means to turn the head intermittently to change the carriers from feeding to wrapping position and back, a bunch carrier movable across a carrier while it is in wrapping position, and means to apply the wrapper to the bunch as it moves across said wrapper carrier.

3. In a cigar wrapping machine, the combination of a hollow rotary head, a plurality of hollow carriers having hollow pivot stems projecting into said head and communicating with the interior thereof, and adapted to permit suction in said head and carriers, to hold a wrapper thereon, means to intermittently rotate the head to interchange the carriers between feeding and wrapping positions, a bunch carrier movable across the wrapper carrier in wrapping position, means to apply the wrapper to the bunch as it moves across said carrier, and means to turn each wrapper carrier on its pivot stem as it swings from one position to the other.

4. The combination with a cutting die and a wrapper carrier coöperating therewith, of a roller reciprocating across the die, to cut a wrapper thereon, and means to tilt the roller as it reciprocates, to cause it to act against opposite edges of the die alternately, said means including a frame having oppositely inclined slots and trunnions at opposite ends of the roller, slidable in said slots.

5. The combination with a cutting die and a wrapper carrier coöperating therewith, of a roller reciprocating across the die, to cut a wrapper thereon, and means to tilt the roller as it reciprocates, to cause it to act against opposite edges of the die alternately, said means including a frame having oppositely inclined slots, a yoke within said frame, trunnions slidable in said slots supporting the yoke, the roller being mounted between the arms of the yoke.

6. In a cigar wrapping machine, the combination of a wrapper carrier movable in one plane from feeding to wrapping positions, a chambered die movable in a plane perpendicular to said plane and adapted to inclose the carrier in said chamber when in feeding position, and a roller movable across the die, to cut a wrapper thereon, when said die and carrier are in feeding position.

7. In a cigar wrapping machine, the combination of a wrapper carrier movable intermittently in one plane from feeding to wrapping positions and vice versa, a recessed die movable intermittently in a plane at an angle to said plane and adapted to receive the carrier into said recess when in feeding position, and a roller movable across the die and carrier when the latter are in feeding position, to cut a wrapper on the die.

8. In a cigar wrapping machine, the combination of a horizontal rotary head, a wrapper carrier mounted thereon, means to intermittently turn the head to change the carrier from feeding to wrapping position, a recessed die, means to raise and lower the die, whereby the carrier enters said recess when the die is lowered and clears the same when the die is raised, and a pressure device movable across the die when it is lowered, to cut a wrapper thereon.

9. In a cigar wrapping machine, the combination with a wrapping mechanism, of means to feed a bunch thereto, said means including a trough, a lifter at one end of the trough and movable to lift a bunch therefrom to said mechanism, means to deposit a bunch in the other end of the trough, and means to move the bunch along said trough from said end to the lifter.

10. In a cigar wrapping machine, the combination with a wrapping mechanism, of means to feed a bunch thereto, including a trough, a lifter at one end of the trough and movable to lift a bunch to said mechanism, a rocker adjacent the opposite end of the trough, a sliding needle carried by the rocker and adapted to engage a bunch and carry the same over into the trough, means to advance and retract the needle, and means to shift the bunch along the trough to the lifter.

11. In a cigar wrapping machine, the combination with a wrapping mechanism, of means to feed a bunch thereto, including a trough, a lifter at one end of the trough and movable to lift a bunch to said mechanism, a rocker adjacent the opposite end of the trough, a sliding needle carried by the rocker and adapted to engage a bunch and carry the same over into the trough, means to advance and retract the needle, and means to shift the bunch along the trough to the lifter, including a lever working along the trough and having a fork at its end to receive the needle and strip the bunch therefrom.

12. In a cigar wrapping machine, the combination with a wrapper carrier, of a wrapping mechanism movable across the carrier and including a rotary needle and a finger, means to advance the needle and the finger, to insert the former into the bunch and enter the latter under the tuck end of a wrapper on the carrier, means to lift the finger after it is so entered, to raise the wrapper to the bunch, means to rotate the needle and finger after the latter is so lifted, and means to subsequently retract the needle and finger.

13. In a cigar wrapping mechanism, the combination of wrapping rollers between which a bunch may be held and rotated, a shaft movable lengthwise toward and from the space between said rollers, a needle carried at the inner end of the shaft and adapted to enter a bunch held by the rollers, a spring finger carried by the shaft and projecting beside the needle, means to advance and retract the shaft, and means to press the finger toward the needle when the shaft is advanced, to apply a wrapper against the bunch engaged by the needle.

In testimony whereof, I affix my signature in presence of two witnesses.

WILLIAM AUGUSTINE MOONEY.

Witnesses:
MARION S. BRANCH,
CHAS. A. FULMER.

Copies of this patent may be obtained for five cents each, by addressing the "Commissioner of Patents, Washington, D. C."